US012109153B2

(12) United States Patent
Schopler et al.

(10) Patent No.: US 12,109,153 B2
(45) Date of Patent: Oct. 8, 2024

(54) LATERAL SPINE POSITIONING SYSTEM

(71) Applicant: BONE FOAM, INC., Corcoran, MN (US)

(72) Inventors: Steven A. Schopler, Bakersfield, CA (US); Choll W. Kim, San Diego, CA (US); Benjamin J. Watters, III, Saint Louis Park, MN (US); Clinton J. McCullough, Blaine, MN (US); Peter A. Cole, North Oaks, MN (US)

(73) Assignee: Bone Foam, Inc., Corcoran, MN (US)

( * ) Notice: Subject to any disclaimer, the term of this patent is extended or adjusted under 35 U.S.C. 154(b) by 568 days.

(21) Appl. No.: 17/180,648

(22) Filed: Feb. 19, 2021

(65) Prior Publication Data

US 2021/0259900 A1 Aug. 26, 2021

Related U.S. Application Data

(60) Provisional application No. 62/979,614, filed on Feb. 21, 2020.

(51) Int. Cl.
*A61G 13/00* (2006.01)
*A61G 13/12* (2006.01)

(52) U.S. Cl.
CPC ....... *A61G 13/1295* (2013.01); *A61G 13/121* (2013.01); *A61G 13/123* (2013.01);
(Continued)

(58) Field of Classification Search
CPC ............ A61G 13/0036; A61G 13/0054; A61G 13/009; A61G 13/02; A61G 13/04; A61G 13/08; A61G 13/12; A61G 13/1205; A61G 13/121; A61G 13/122; A61G 13/125; A61G 13/123; A61G 13/1235; A61G 13/124;
(Continued)

(56) References Cited

U.S. PATENT DOCUMENTS 3,694,831 A * 10/1972 Treace ..................... A47G 9/10
5/636
4,214,326 A 7/1980 Spann
(Continued)

FOREIGN PATENT DOCUMENTS

DE 9112310 U1 1/1992

OTHER PUBLICATIONS

International Search Report and Written Opinion received for PCT Patent Application No. PCT/US21/18932, mailed on May 4, 2021, 9 pages.

(Continued)

*Primary Examiner* — Adam Baker
(74) *Attorney, Agent, or Firm* — Workman Nydegger

(57) ABSTRACT

A patient positioning system for positioning a patient in the lateral decubitus position in preparation for a lateral approach spinal procedure. The patient positioning system includes a base section having a head bolster, an axillary bolster, and a hip bolster. The system also includes a lateral arm support configured to support the arms of the patient in a generally parallel position extending in the anterior direction away from the torso of the patient, and a leg bolster positionable between the legs of the patient and configured to support the legs of the patient and space the legs of the patient from one another.

20 Claims, 7 Drawing Sheets

(52) U.S. Cl.
CPC ..... *A61G 13/1235* (2013.01); *A61G 13/1245* (2013.01); *A61G 13/1265* (2013.01); *A61G 13/129* (2013.01); *A61G 2200/322* (2013.01)

(58) Field of Classification Search
CPC ............ A61G 13/1245; A61G 13/1255; A61G 7/1082–1098; A61G 2200/322; A47G 9/1054; A47G 9/1081; A47G 9/109; A47C 20/021; A47C 20/023; A47C 16/00; A47C 16/02
USPC .......................................................... 128/845
See application file for complete search history.

(56) References Cited

U.S. PATENT DOCUMENTS

| | | | | |
|---|---|---|---|---|
| D272,467 | S | 1/1984 | Nightingale | |
| D301,166 | S | 5/1989 | Miklja | |
| 4,901,384 | A * | 2/1990 | Eary | A47C 20/021 D6/601 |
| D321,760 | S | 11/1991 | Carney | |
| D325,087 | S | 3/1992 | Brinker | |
| 5,613,254 | A | 3/1997 | Clayman et al. | |
| 5,664,271 | A * | 9/1997 | Bellavance | A47C 20/021 5/652 |
| 6,038,722 | A * | 3/2000 | Giori | A47C 27/18 5/709 |
| D426,307 | S | 6/2000 | Swedberg et al. | |
| 7,316,041 | B2 * | 1/2008 | Guez | A47G 9/10 5/636 |
| D657,468 | S | 4/2012 | Held | |
| 8,176,585 | B1 * | 5/2012 | Isham | A61G 13/123 5/710 |
| D690,016 | S | 9/2013 | Ratner | |
| D698,030 | S | 1/2014 | Crisco et al. | |
| 8,850,634 | B2 * | 10/2014 | Ponsi | A47C 20/04 5/81.1 R |
| D841,165 | S | 2/2019 | McCormack et al. | |
| D886,300 | S | 6/2020 | Marcil | |
| D954,967 | S | 6/2022 | Watters et al. | |
| D954,974 | S | 6/2022 | Watters et al. | |
| D954,975 | S | 6/2022 | Potter et al. | |
| D959,009 | S | 7/2022 | Zhou | |
| 2003/0167569 | A1 | 9/2003 | Newkirk et al. | |
| 2004/0133979 | A1 | 7/2004 | Newkirk et al. | |
| 2008/0301878 | A1 * | 12/2008 | Elhabashy | A61G 13/12 5/646 |
| 2010/0192300 | A1 * | 8/2010 | Tannoury | A61G 13/0036 5/607 |
| 2012/0110742 | A1 * | 5/2012 | Lawler | A61G 13/121 5/636 |
| 2017/0049651 | A1 | 2/2017 | Lim et al. | |
| 2018/0116891 | A1 | 5/2018 | Beale et al. | |
| 2019/0314236 | A1 | 10/2019 | Hight et al. | |
| 2022/0265500 | A1 | 8/2022 | Schopler et al. | |

OTHER PUBLICATIONS

International Preliminary Report on Patentability received for PCT Patent Application No. PCT/US21/18932, mailed on Sep. 1, 2022, 07 pages.

Saunders Lumbar Traction Device. Online, published date unknown. Retrieved on Sep. 13, 2022 from URL: https:// www.sourceortho.net/saunders-lumbar-traction-device/.

* cited by examiner

LATERAL SPINE POSITIONING SYSTEM

CROSS-REFERENCE TO RELATED APPLICATIONS

This application claims priority to and the benefit of U.S. Provisional Patent Application No. 62/979,614, filed Feb. 21, 2020, the entirety of which is incorporated herein by this reference.

BACKGROUND

Proper positioning of patients in preparation for spine surgery is extremely important in order to provide good operating conditions and effective access to the operative site. During spine surgery, patients are typically placed in positions that are not completely physiologic and need to be stabilized and maintained in those positions for considerable amounts of time. Improper positioning of the patient can lead to complications, resulting in severe patient disability and functional loss.

One complication related to improper patient positioning, including patient positioning during spine surgery, is peri-operative peripheral nerve injury (PPNI). PPNI may be caused by direct trauma to affected nerve fibers or by ischemia of the nerve fibers. Prolonged stretching of peripheral nerves may lead to an increase in intraneural pressure and compression of intraneural capillaries and venules, which leads to a reduction in the perfusion pressure of the nerve fibers and associated disruption of axons and vasa nervosum. Prolonged compression may lead to an increase in intraneural and extraneural pressures, leading to a reduction in perfusion and therefore leading to ischemia and slowing of conduction through the nerve fibers. Prolonged ischemia of nerve fibers leads to demyelination and associated axonal damage. Specific forms of PPNI include ulnar neuropathy, brachial plexus injuries, median neuropathy, and radial neuropathy.

Further, patients come in a variety of shapes and sizes, and each therefore has unique positioning needs to provide the best access to the surgical site. The diversity of patient anatomy, as well as the significance of the damage that can result from improper positioning, underscore the challenges involved in spinal surgery patient positioning.

Different patient positions are utilized in spine surgeries. The lateral decubitus position is used for lateral approach procedures such as lateral lumbar interbody fusion (LLIF), oblique interbody fusion (OLIF), extreme lateral interbody fusion (XLIF), and direct lateral interbody fusion (DLIF). The lateral position is used less frequently than the prone position but is used for less invasive procedures and appears to be gaining in popularity.

The conventional approaches for lateral spine positioning have several limitations, however. For example, although tape is relatively inexpensive and readily available, its application takes time, it does not position or reposition well, it sticks to itself and is hard to handle, and it is not reusable. Other conventional positioning means include towels, pillows, and sheets. These could deform over time during the procedure, are time intensive to prepare, and may be overly bulky for some applications. The use of inflatable bags, such as IV bags, also involves limitations related to potential deflation, excessive time taken to inflate and position, and potential discomfort if over or under inflated.

The potential complications described above highlight the need for proper and safe patient positioning while also allowing the surgeon to gain effective access in a manner that minimizes procedure time.

Accordingly, there is an ongoing need for improved patient positioning systems. In particular, there is an ongoing need for an improved patient positioning system configured for positioning a patient in a lateral position in preparation for an lateral approach spine procedure.

SUMMARY

Described herein are patient positioning systems configured to position the patient in the lateral decubitus position in preparation for a lateral approach spine procedure, such as an LLIF, OLIF, XLIF, or DLIF procedure. In one embodiment, a patient positioning system includes a base section having a head bolster, an axillary bolster, and a hip bolster. The system also includes a lateral arm support configured to support the arms of the patient in a generally parallel position extending in the anterior direction away from the torso of the patient, and a leg bolster positionable between the legs of the patient and configured to support the legs of the patient and space the legs of the patient from one another.

In one embodiment, the lateral arm support includes a pair of spaced apart panels with one forming a superior panel and the other forming an inferior panel, an upper arm support surface extending between the upper side of the superior panel and the upper side of the inferior panel, and a lower arm support surface extending between the lower side of the superior panel and the lower side of the inferior panel. The panels have shapes that define an anterior cutout extending from the anterior side of the lateral arm support towards the posterior side of the lateral arm support, beneficially allowing increased visualization and access to the lower arm of a patient.

In one embodiment, the leg bolster includes an upper leg channel extending from a superior end to an inferior end along an upper side of the device, a lower leg channel extending from a superior end to an inferior end along a lower side of the device, and a knee flexion structure disposed between the superior end and the inferior end, the knee flexion structure configured to allow the superior portion and the inferior portion to bend relative to one another in an anterior/posterior direction. The knee flexion structure may include an expandable element disposed along an anterior side to allow the anterior side of the knee flexion structure to stretch and expand, and a collapsible element disposed along a posterior side to allow the posterior side of the knee flexion structure to collapse. Together, the expandable element and collapsible element allow the knee flexion structure to flex and match the contour of the patient's legs when positioned with slight knee extension.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

DETAILED DESCRIPTION

Positioning System Overview

Figure 1:
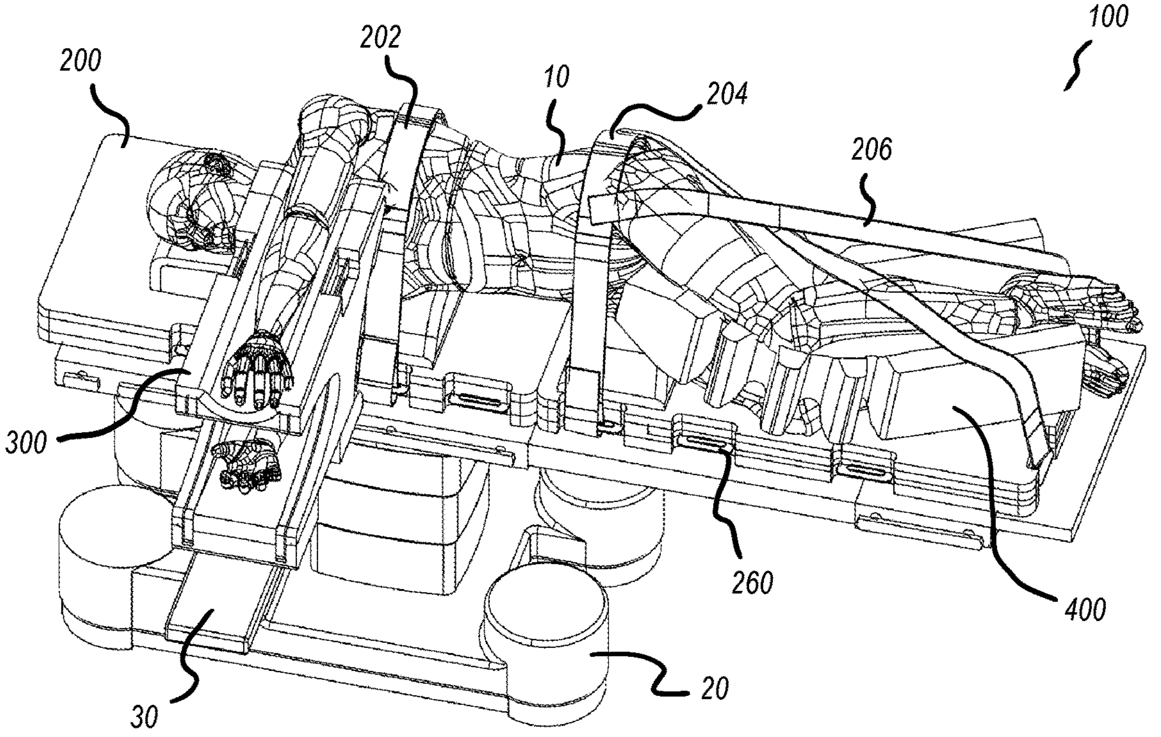
FIG. 1 illustrates an isometric view of a patient positioning system configured for positioning a patient in the lateral decubitus position, showing a patient positioned using the system.

FIG. 1 illustrates an exemplary patient positioning system 100 showing a patient 10 positioned thereon in the lateral decubitus position. The patient 10 is typically first placed in the supine position for intubation and/or other preparatory procedures before being rolled to the lateral decubitus position. As described in more detail below, the positioning system 100 includes multiple subcomponents that may be assembled to form the full positioning system 100 as shown. In this embodiment, the subcomponents include a base section 200, a lateral arm support 300, and a leg bolster 400. The use of separable components allows the system 100 to be disassembled and more easily stored, but still be readily assembled when needed.

As shown, the positioning system 100 allows the patient 10 to be positioned in the lateral decubitus position with the arms extending in a parallel, anterior direction and with the hips and knees in slight flexion to provide a comfortable, stable position for the lower body. The positioning system 100 will typically be placed upon an operating table 20 that includes an arm board 30 for supporting the lateral arm support 300. The base section 200 may be formed of separate pieces to accommodate use with a flexing operating table 20. That is, the inferior portion will typically be lowered to put the patient in the "jackknife" position for better exposure of the targeted lumbar region of the spine.

The illustrated positioning system 100 includes a torso strap 202 that attaches to the base section 200 and/or operating table 20 and extends up and over the patient's torso to aid in securing the upper body of the patient in the desired lateral position. The positioning system 100 also includes a hip strap 204 that attaches to the base section 200 and/or operating table 20 and extends up and over the patient's hip. One or more hip traction straps 206 are attached to the hip strap 204. In a preferred embodiment, multiple hip traction straps 206 are utilized and are angled to cross one another.

Each hip traction strap 206 has a superior end that attaches to the hip strap 204 and an inferior end that extends in the inferior direction. The inferior ends of the hip traction straps 206 may be manipulated and/or positioned to pull inferiorly on the hip strap 204 and thereby apply inferior traction to the upper side of the patient's hip. This traction aids in opening the space between the iliac crest and the last rib, such as when the inferior part of the operating table is angled downward, for better exposure of targeted regions of the lumbar spine.

The illustrated straps (torso strap 202, hip strap 204, and hip traction straps 206) may include fastener elements (e.g., hook and loop features) that allow a connection to corresponding strap supports 260 of the base section 200. The strap supports 260 may be formed as plates slotted for looping of the strap ends therethrough. While the illustrated strap, strap support, and fastener embodiments described herein are exemplary, other embodiments may additionally or alternatively include other strap hardware elements known in the art, such as clamps, clasps, buckles, cams, tiedowns, ratchets, and the like.

The straps of the positioning system 100 preferably have a width of about 2 to about 4 inches (5-10 cm), or about 2.25 to about 3.5 inches (about 5.7-8.9 cm), or about 2.5 to about 3 inches (6.35-7.62 cm). Padding may optionally be provided along the straps, particularly where direct contact with the patient is expected. The padding may be in the form of a sleeve or sheath formed from foam and/or other suitably soft material to provide pressure relief to the torso and/or hip during the duration of the procedure.

One or more additional straps may also be attached to the positioning system 100 to further aid in restraining the patient in the desired position. Multiple different strap supports 260 may be positioned along the longitudinal length of the base section 200 to allow for custom placement of straps based on differing patient anatomy and/or different particular procedural needs. Straps may additionally or alternatively be placed over other portions of the patient, such as the lower chest, lower legs, and/or thighs.

Base Section

Figure 2A:
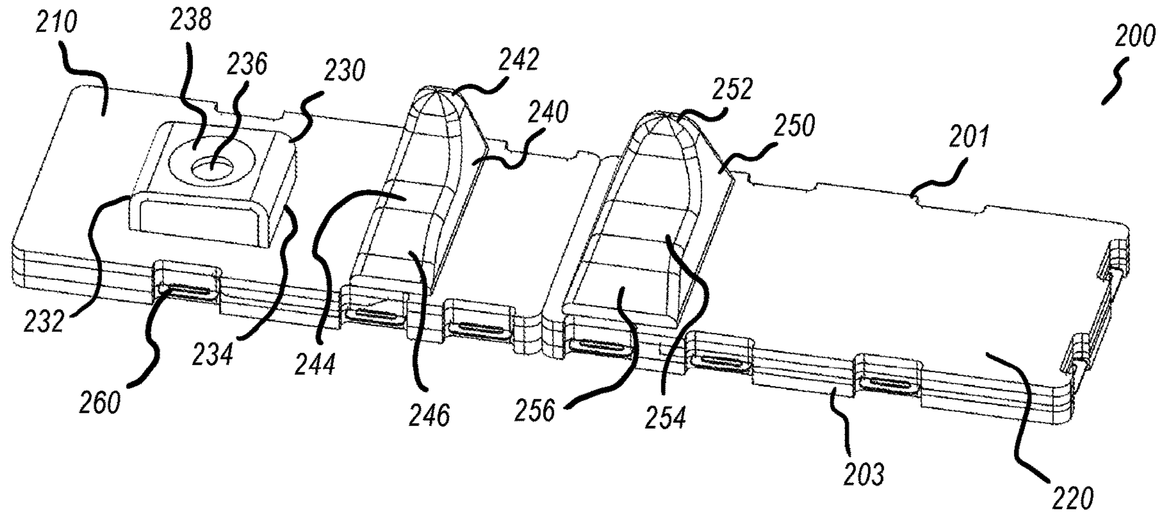
FIG. 2A illustrates a detailed perspective view of a base section of the patient positioning system.

FIG. 2A is perspective a view of the base section 200 with other components of the positioning system removed. The base section 200 includes a superior portion 210 and an inferior portion 220, each having a posterior side 201 and an anterior side 203. These may be formed as separate pieces or, alternatively, they may be joined together by a flexible median that allows bending of the two portions relative to one another.

The illustrated base section 200 includes a head bolster 230, an axillary bolster 240, and a hip bolster 250. The head bolster 230 and axillary bolster 240 may be positioned on the superior portion 210 while the hip bolster 250 may be positioned on the inferior portion 220 so that when the operating table is bent, the hip bolster 250 can continue to cushion the inferior side of the pelvis. In some embodiments, the positions of the bolsters upon the upper surface of the base section 200 can be adjustable according to particular patient and/or procedure needs. Additional bolsters at additional positions may also be utilized. For example, two adjacent bolster components, rather than one integrated unit, may form the hip bolster 250.

The illustrated head bolster 230 includes a slightly angled upper surface that provides good patient head positioning for intubation when the patient is in the supine position while still providing effective support for a substantially neutral head position when the patient is turned to the lateral position. The head bolster 230 includes a superior end 232, an inferior end 234, and an angled upper surface that slopes slightly downward from the inferior end 234 to the superior end 232 at an angle of about 5 to about 20 degrees, or about 8 to about 15 degrees.

The head bolster 230 also includes an ear cutout 236 that removes pressure points on the patient's ear when in the lateral position. A countersink 238 surrounds the ear cutout 236 and provides a transition between the ear cutout 236 and the upper surface of the head bolster 230.

The axillary bolster 240 includes a median surface 244 for supporting the downward facing side of the patient's chest just inferior of the shoulders. As best shown in FIG. 1, the patient's down shoulder rests between the head bolster 230 and the axillary bolster 240. The axillary bolster 240 thus functions to raise the surrounding torso and relieve pressure on the down shoulder. The median surface 244 may be generally flat or may include a concave-shaped depression. Good pressure-relieving results have been found when the median surface 244 sits at a height of about 1 to about 3 inches (about 2.5-7.6 cm) above the upper surface of the superior portion 210, or about 1.5 to about 2.5 inches (about 3.81-6.35 cm) above the upper surface of the superior portion 210.

The illustrated axillary bolster 240 also includes a post 242 that rises above the median surface 244 and is disposed on the posterior side of the median surface 244. The post 242 functions to stabilize the patient once moved to the lateral position and prevents the patient from rolling in the posterior direction back to the supine position. When included, the post 242 preferably has a height of about 4 to about 8 inches (about 10-20 cm), or about 5 to about 7 inches (about 12.7-17.8 cm), above the upper surface of the superior portion 210.

The illustrated axillary bolster 240 also includes a wedge 246 disposed on an anterior side of the median surface 244 that angles downward from the median surface 244 in the anterior direction. When included, the wedge 246 allows for easier placement of the axillary bolster 240. For example, after the patient has been rolled from the supine to the lateral position, the axillary bolster 240 may be slid wedge first under the patient from the posterior side 201 toward the anterior side 203.

The hip bolster 250 is similar in construction to the axillary bolster 240, and similarly includes a median surface 254, a post 252 posterior to the median surface 254, and a wedge 256 anterior to the median surface 254. The hip bolster 250 is preferably slightly taller and slightly wider than the axillary bolster 240, however. For example, the median surface 254 may have a height of about 1.25 to about 3.25 inches (about 3.175-8.255 cm) above the upper surface of the inferior portion 220, or about 1.75 to about 2.75 inches (about 4.445-6.985 cm) above the upper surface of the inferior portion 220. The post 252 may rise to a height of about 4.5 to about 8.5 inches (about 11.4-21.6 cm) above the upper surface of the inferior portion 220, or about 5.5 to about 7.25 inches (about 14-18.4 cm) above the upper surface of the inferior portion 220. The hip bolster 250 may have a width (measured along the superior/inferior axis) of about of about 4.5 to about 7.5 inches (about 11.4-19.1 cm), or about 5 to about 7 inches (about 12.7-17.8 cm).

The head bolster 230, axillary bolster 240, and/or hip bolster 250 may be integrally formed with the rest of the base section 200 or may be formed as separate pieces that are attachable to the superior portion 210 and inferior portion 220 to form the assembled base section 200. Where the components are formed as separate, attachable pieces, the attachment may be made via friction fit, hook and loop fastener, or other suitable attachment means.

Figure 2B:
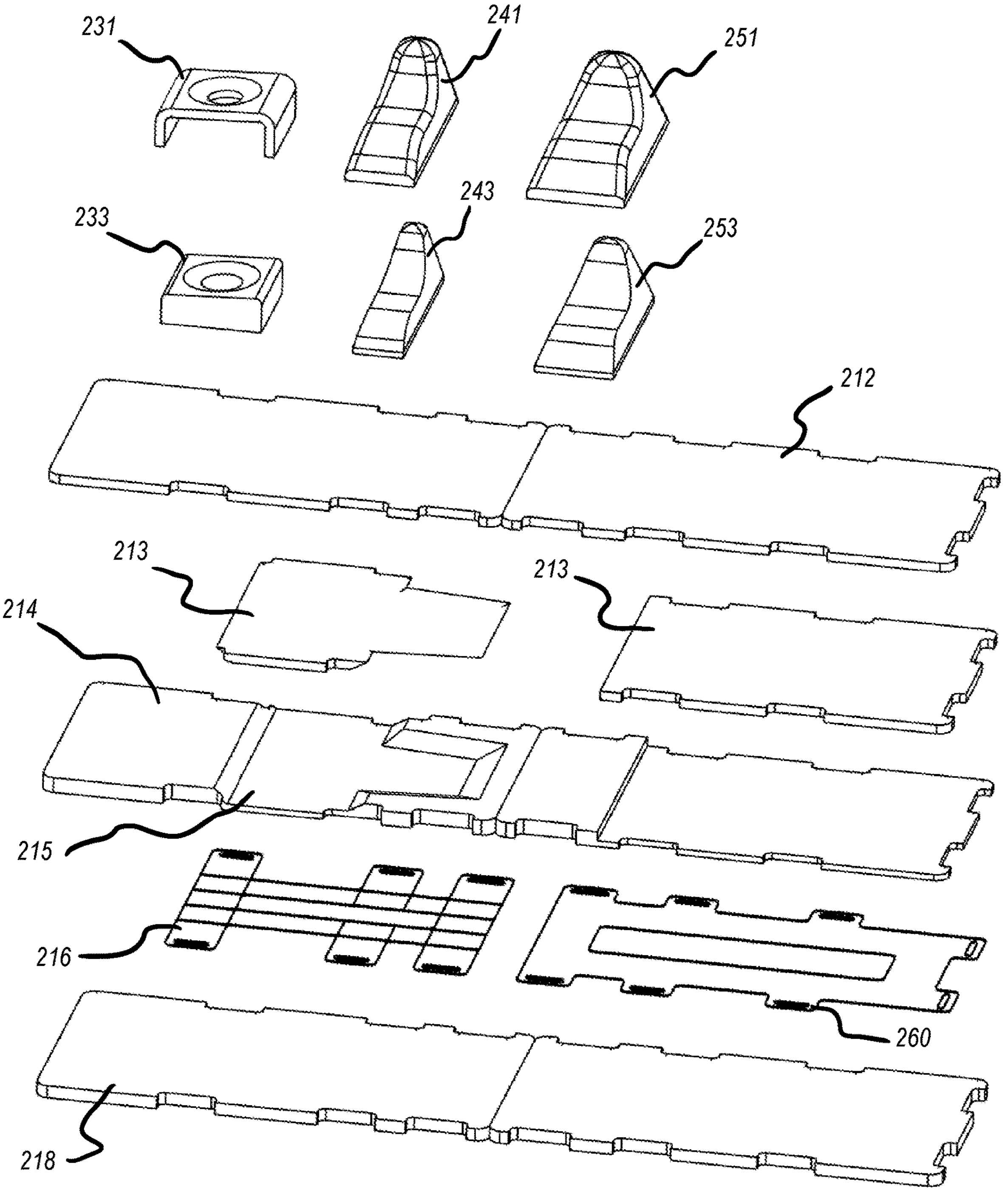
FIG. 2B illustrates an exploded view of the base section of FIG. 2A.

FIG. 2B illustrates an exploded view of the base section 200. As shown, each of the head bolster, axillary bolster, and hip bolster may include upper layers 231, 241, 251 and separate interior layers 233, 243, 253. The upper layers may be formed from a first foam material and the interior layers may be formed from a second, different foam material that is firmer than the first material. The softer upper layers prevent soft tissue injuries at tissues in direct contact with the bolsters, while the firmer interior layers provide effective support and structural integrity.

The upper layers 231, 241, 251 are preferably formed from a soft, viscoelastic "memory" foam material. Such memory foam materials typically have a 25% indentation load deflection (ILD) of about 10 to about 40 pounds (about 4.5-18.1 kg), or more preferably about 20 to about 35 pounds (about 9-16 kg). The foam material of the upper layers may have a density of about 3 to about 9 pounds per cubic foot (PCF) (about 48-144 kg/m$^3$), or more preferably about 4 to about 8 PCF (about 64-128 kg/m$^3$), or about 5 to about 7 PCF (about 80-112 kg/m$^3$) and may have thicknesses of about 0.25 inches to about 1.25 inches (about 0.635-3.175 cm), such as about 0.5 inches to about 1 inch (about 1.27-2.54 cm).

The interior layers 233, 243, 253 are preferably formed from a foam material with greater firmness than the upper layers to provide effective support and stability to the overall structure of the bolsters. For example, the interior layers may have an ILD of at least about 50 pounds (at least about 22.7 kg), more preferably at least about 65 pounds (at least about 29.5 kg) or at least about 80 pounds (at least about 36.3 kg), such as an ILD within a range of about 50 to about 120 pounds (about 22.7-54.4 kg), or about 65 to 110 pounds (about 29.5-49.9 kg), or about 80 to about 100 pounds (about 36.3-45.4 kg). The density of the interior layers may be about 1 to about 4 PCF (about 16-64 kg/m$^3$), such as about 1.5 to about 3 PCF (about 24-48 kg/m$^3$).

The base section 200 also includes multiple layers, including an upper layer 212, a lower layer 218, a strap support layer 216, and an intermediate layer 214. The intermediate layer 214 includes cavities 215 for receiving soft pieces 213. The bulk of the intermediate layer 214 is formed from a relatively firm foam material to provide support to the base section 200. The intermediate layer 214 may be formed from a foam material having an ILD of at least about 50 pounds (at least about 22.7 kg), more preferably at least about 80 pounds (at least about 36.3 kg) or at least about 100 pounds (at least about 45.4 kg), such as an ILD within a range of about 50 to about 150 pounds (about 22.7-68 kg), or about 80 to 135 pounds (about 36.3-61.2 kg), or about 100 to about 120 pounds (about 45.4-54.4 kg).

The soft pieces 213 nest within the corresponding cavities 215 of the intermediate layer 214 to form more cushioned areas for the shoulder and patient legs will be positioned. The soft pieces 213 may be formed from a relatively low ILD foam material (preferably a "memory" foam material) having an ILD of about 10 to about 30 pounds (about 4.5-13.6 kg). The upper layer 212 may also be formed from a relatively low ILD foam material but is preferably somewhat firmer than the soft pieces 213. The upper layer 212 may be formed from a foam material having an ILD of about 20 to about 50 pounds (about 9-22.7 kg), or about 25 to about 40 pounds (about 9-18.1 kg), for example.

The strap support layer 216 is preferably formed from two separate pieces to thereby integrate the strap supports 260 into a single structural component for the superior portion and a single structural component for the inferior portion. This beneficially enables forces applied to the strap supports to be better spread across the strap support layer 216 rather than focused at smaller regions immediately adjacent the strap supports 260. Better spreading applied forces beneficially reduces the risk that foam materials of the other layers, and/or the strap supports themselves, are damaged. The strap support layers 216 may be formed from a relatively rigid material such as metal or more preferably a rigid plastic such as high-density polyethylene (HDPE) or acrylonitrile butadiene styrene (ABS).

The lower layer 218 may be less firm than the intermediate layer 214. For example, the lower layer 218 may have a firmness that allows it to provide some structural support to the overall base section 200 and to pad the strap support layer 216 but to also compress somewhat under typical patient weight. The lower layer 218 may have an ILD, for example, of about 15 to about 35, or more preferably about 20 to about 30. In other embodiments, the lower layer 218 may be formed of a foam material that is relatively more firm, similar to the foam material of the intermediate layer 214.

The base section 200 preferably has a width of about 16 to about 22 inches (about 40.64-55.88 cm), or more preferably about 18 to about 20 inches (about 45.7-50.8 cm). Such a width fits well upon most standard operating tables and allows easy attachment to standard operating tables without having overhanging and/or encumbering sections. The base section 200 may have an overall length of about 50 to about 95 inches (about 127-241 cm), such as about 60 to about 85 inches (about 152-216 cm), or about 65 to about 80 inches (about 165-203 cm).

Figure 3A:
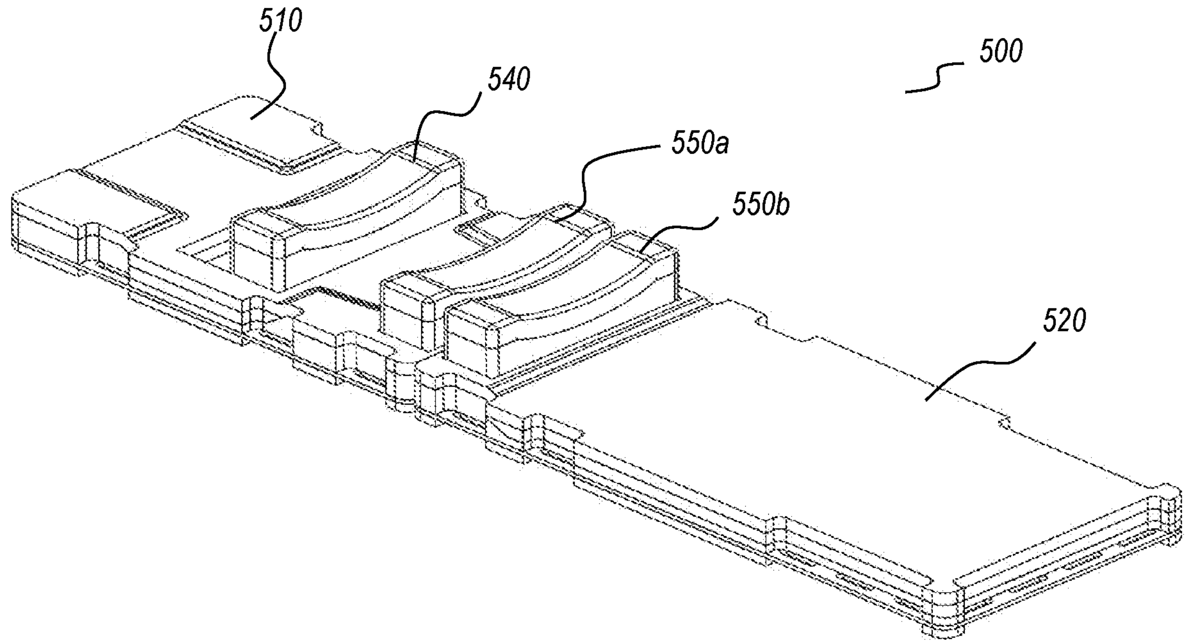
FIG. 3A illustrates a detailed perspective view of an alternative embodiment of a base section of the patient positioning system.
Figure 3B:
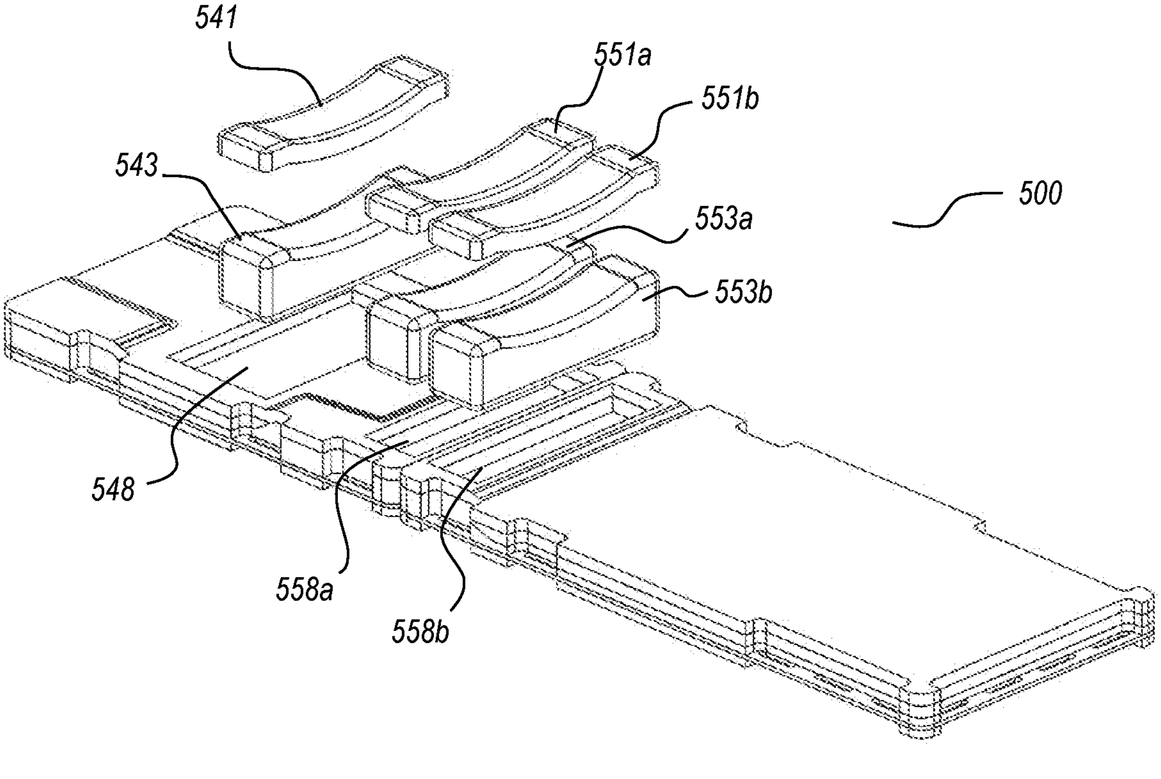
FIG. 3B illustrates an exploded view of the base section of FIG. 3A.

FIGS. 3A and 3B illustrate an alternative embodiment of a base section 500 that utilizes air bladders in conjunction with one or more bolsters to provide selective control of patient support and positioning. The features and components described above in relation to the base section 200 (including preferred materials, dimensions, and interaction with other components) remain applicable to the base section 500, with the exception of the differences described below.

As with the base section 200, the base section 500 includes a superior portion 510, an inferior portion 520, an axillary bolster 540, and a hip bolster (here formed by two separate bolster pieces **550*a* and 550*b*). In this embodiment, one or more of the bolsters 540, 550*a*, or 550*b* are operatively associated with a selectively inflatable air bladder. One or more of bolsters 540, 550*a*, or 550*b*** can include ports and valves that provide connection to one or more pumps (e.g., a hand or foot pump) to enable operating room personnel to control the degree of inflation of the bladders. The personnel can beneficially adjust the amount of axillary and/or hip lifting on the fly without having to readjust padding components and without having to add or remove padding components. This minimizes patient movement during the procedure and allows for faster positioning maneuvers.

As shown in FIG. 3B, the bolsters 540, **550*a*, and 550*b* can include upper layers 541, 551*a*, and 551*b* that are separate from the bladders 543, 553*a*, and 553*b* themselves. The upper layers 541, 551*a*, and 551*b* may be formed from a soft, viscoelastic "memory" foam material as with the upper layers 241 and 251 of base section 200. The illustrated base section 500 includes cavities 548, 558*a*, and 558*b* configured to receive the air bladders 543, 553*a*, and 553*b*, respectively. The air bladders 543, 553*a*, and 553*b*** may be attached to their respective cavities via friction fit, hook and loop fasteners, or other suitable attachment means.

The illustrated embodiment utilizes two separate bolsters **550*a* and 550*b* to function as a hip bolster. Other embodiments utilize a single, integrated air bladder and bolster to function as the hip bolster. There are certain advantages, however, in having separate hip bolster pieces. For example, with two separate bolster pieces, operating room personnel have more granular control over how the hip is supported, such as being able to add more air to the superior hip bolster 550*a* than the inferior hip bolster 550*b***, or vice versa.

In the illustrated embodiment, the superior hip bolster **550*a* is positioned on the superior portion 510 and the inferior hip bolster 550*b* is positioned on the inferior portion 520. This beneficially allows for a separate hip bolster portion to be positioned on each side of the bend when the base 500 is placed in the "jackknife" position, and thereby provides effective patient positioning control via adjustment of air bladders 533*a* and 533*b*** as desired.

Lateral Arm Support

Figure 4A:
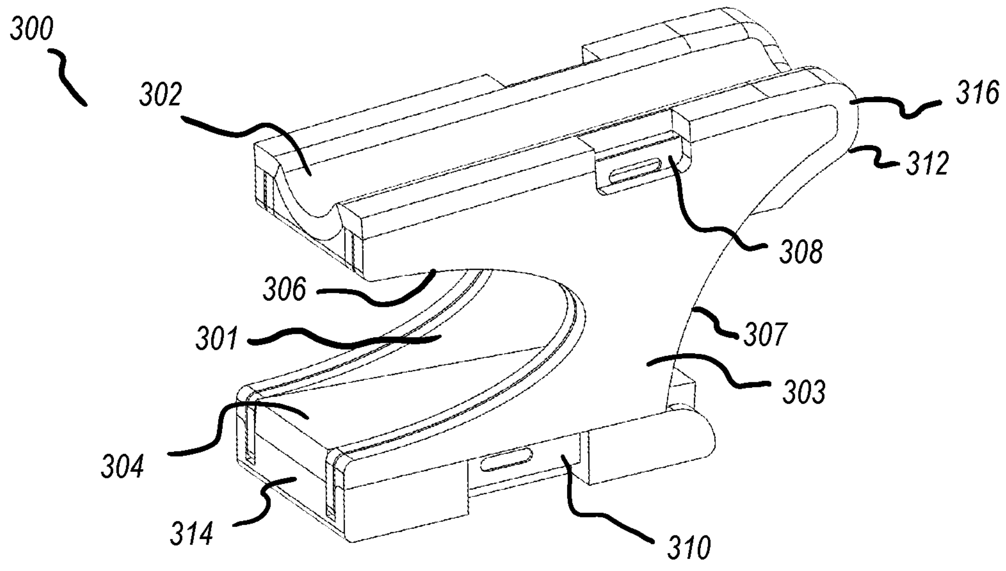
FIG. 4A illustrates a detailed perspective view of a lateral arm support component of the patient positioning system.
Figure 4B:
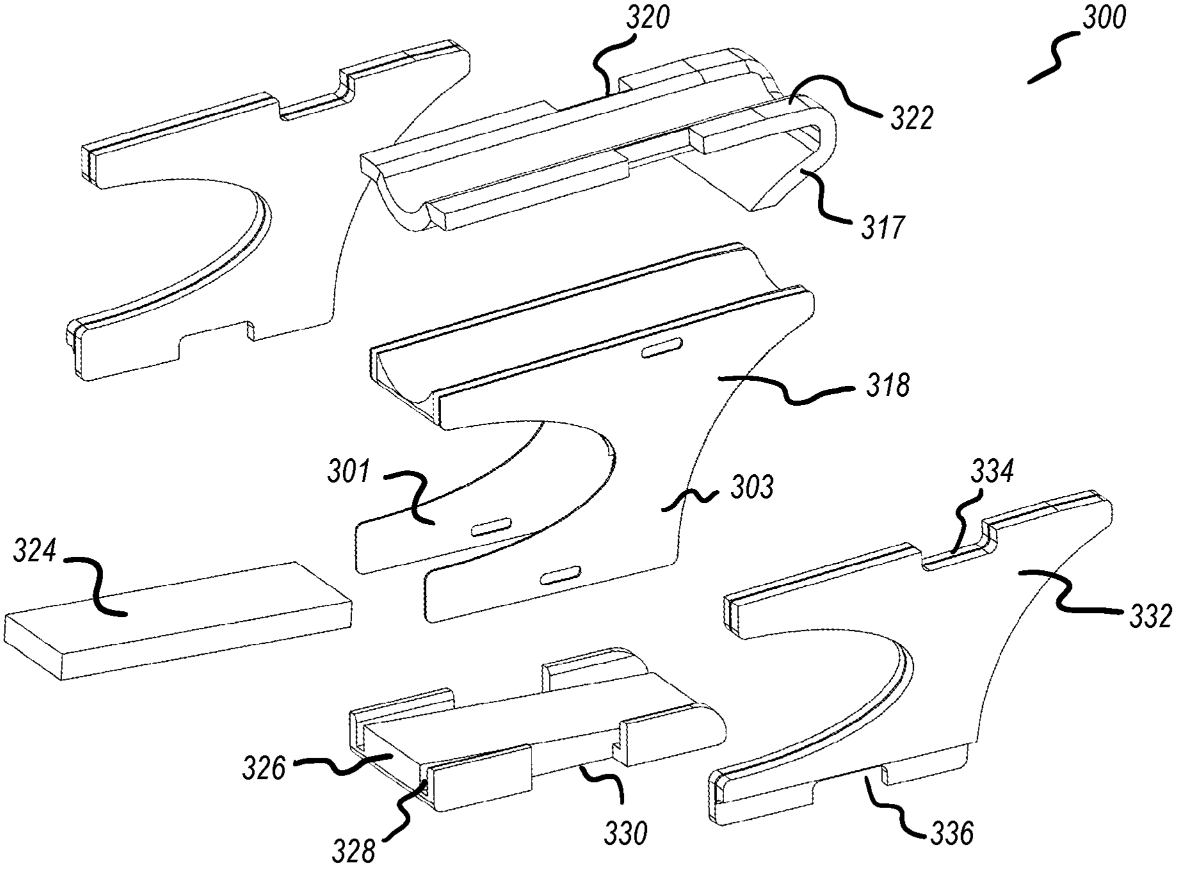
FIG. 4B illustrates an exploded view of the lateral arm support component of FIG. 4A.

FIGS. 4A and 4B illustrate an exemplary embodiment of a lateral arm support 300, in detail and exploded views, respectively, that may be utilized with the patient positioning system 100. The lateral arm support 300 includes a pair of spaced apart panels 301 and 303. When the device is in use, the panels 301 and 303 are positioned upright, with one facing the superior direction (a superior panel) and one facing the inferior direction (an inferior panel). An upper arm support surface 302 extends between the upper sides of the panels 301, 303, and a lower arm support surface 304 extends between lower sides of the panels 301, 303.

The panels 301, 303 are shaped so as to define an anterior cutout 306 extending from the anterior side 314 of the arm support towards the posterior side 312 of the arm support. The anterior cutout 306 provides increased visualization and access to the lower arm of the patient when the arms are positioned on the device, such as for managing intravenous lines. The anterior cutout 306 preferably has a parabolic shape, as shown, but may alternatively have other curved or non-curved shapes.

The anterior cutout 306 preferably extends inward posteriorly from the anterior side 314 a distance that is about 75% to about 125% of the height of the arm support 300. Additionally, or alternatively, the anterior cutout 306 may extend a distance equal to about 25% to about 75% of the overall width of the lateral arm support 300 from anterior side 314 to posterior side 312. For example, the anterior cutout 306 may extend inward from the anterior end 314 a distance of about 6 to about 18 inches, (about 15-46 cm) or about 8 to about 16 inches (about 20-40 cm), or about 10 to about 14 inches (about 25-36 cm). Such a cutout depth beneficially provides effective visualization and access to the lower arm of the patient while also maintaining overall structural integrity of the arm support 300 and maintaining a low-profile design in relation to the overall size of the arm support 300.

The upper arm support surface 302 preferably has a slight downward slope from the posterior end 312 to the anterior end 314 of the device, such as at an angle of about 2 to about 10 degrees, or about 3 to about 8 degrees. On the other hand, the lower arm support surface 304 preferably has a slight upward slope from the posterior end 312 to the anterior end 314 of the device (e.g., about 2 to about 15 degrees, or about 3 to about 10 degrees). This prevents excessive horizontal abduction extension of the patient's arms as well as excessive extension of the elbow, which beneficially reduces the risk of PPNIs.

As shown, the upper arm support surface 302 may extend farther posteriorly than the lower arm support 304. The posterior portion of the upper arm support surface forms a chest bumper 316 that sits against the upward portion of the patient's chest and prevents forward anterior rolling of the patient.

The lateral arm support 300 may also include a posterior cutout 307 that extends anteriorly from the posterior side 312 of the device. This also aids in reducing the profile of the arm support 300 and in increasing visibility and access to the lower arm when it sits upon the lower arm support surface 304.

The lateral arm support 300 may also include one or more upper arm strap supports 308 for fastening straps used for securing the patient's upper arm to the upper arm support surface 302, and one or more lower strap supports 310 for fastening straps used for securing the arm support device to the operating table (e.g., to the arm board of an operating table).

As best shown in FIG. 4B, the arm support 300 may be made of separate pieces that allow for easy detachment and separation in a manner beneficial in light of patient positioning requirements. The arm support 300 may include a base piece 318 that includes the panels 301 and 303. The base piece 318 may be formed of a relatively rigid material such as HDPE, ABS, and/or other suitable material, and may integrally include the strap supports 308 and 310.

Other pieces formed of foam material of various firmness levels may be attached to the base piece 318 to form the arm support 300. Side pieces 332 are attached to the panels 301 and 303. The side pieces 332 may include notches 334 and 336 corresponding to the strap supports 308 and 310. An upper piece 322 sits upon the base piece 318 to form the upper support surface 302. The upper piece 322 may include notches coinciding with the upper arm strap supports 308. The posterior portion of the upper piece 322 preferably wraps around to form a lip 317. The lip 317 helps define and provides padding to the chest bumper 316.

The upper arm support surface 302 and lower arm support surface 304 may be formed from a relatively soft foam material, such as one having an ILD of about 10 to about 35 pounds (about 4.54-15.88 kg), or more preferably about 15 to about 25 pounds (about 6.8-11.3 kg). The other pieces may be formed of firmer foam materials, and may have an ILD of about 50 to about 120 pounds (about 22.7-54.4 kg), for example.

A lower piece 326 includes grooves 328 into which the panels 301, 303 of the base piece 318 fit. The lower piece 318 may also include notches 330 to coincide with lower strap supports 310. Lower surface piece 324 is placed upon the lower piece 318 to form the lower arm support surface 304.

In use, when the surgeon or healthcare provider desires greater access to the lower arm and/or needs to move the patient, the patient's upper arm is first unsecured (e.g., unstrapped) and moved off of the upper arm support surface 302. The upper sections of the device, including the upper support surface 302 and panels 301, 303 may then be readily detached from the lower arm support surface 304 and moved out of the way. The patient's lower arm is then fully exposed and can be attended to and/or moved off of the lower arm support surface 304. The arm support 300 thus allows independent movement of the patient's upper arm or lower arm off of its respective support surface without requiring that the other arm be moved off its support surface at the same time.

Although the lateral arm support 300 is described herein in relation to the overall lateral decubitus patient positioning system 100, it may be used in other applications not necessarily limited to lateral decubitus position spine procedures. For example, other procedures where it would be beneficial to support the patient's arms in the anteriorly extended position may also effectively utilize the lateral arm support 300.

Leg Bolster

Figure 5A:
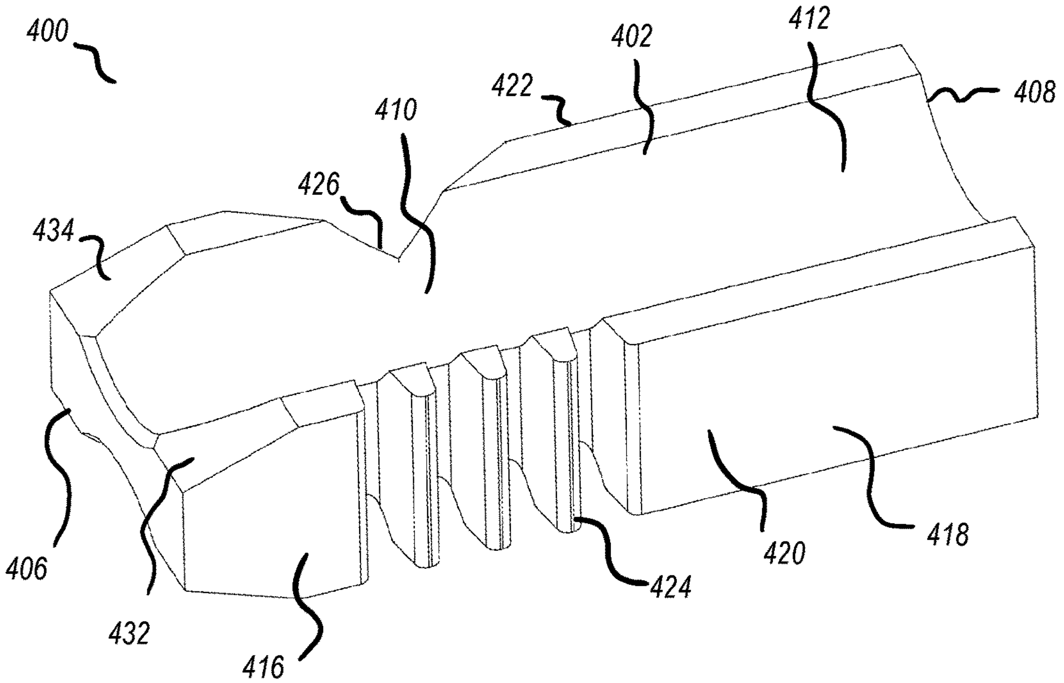
FIGS. 5A and 5B illustrate top and bottom perspective views of a leg bolster component of the patient positioning system.
Figure 5B:
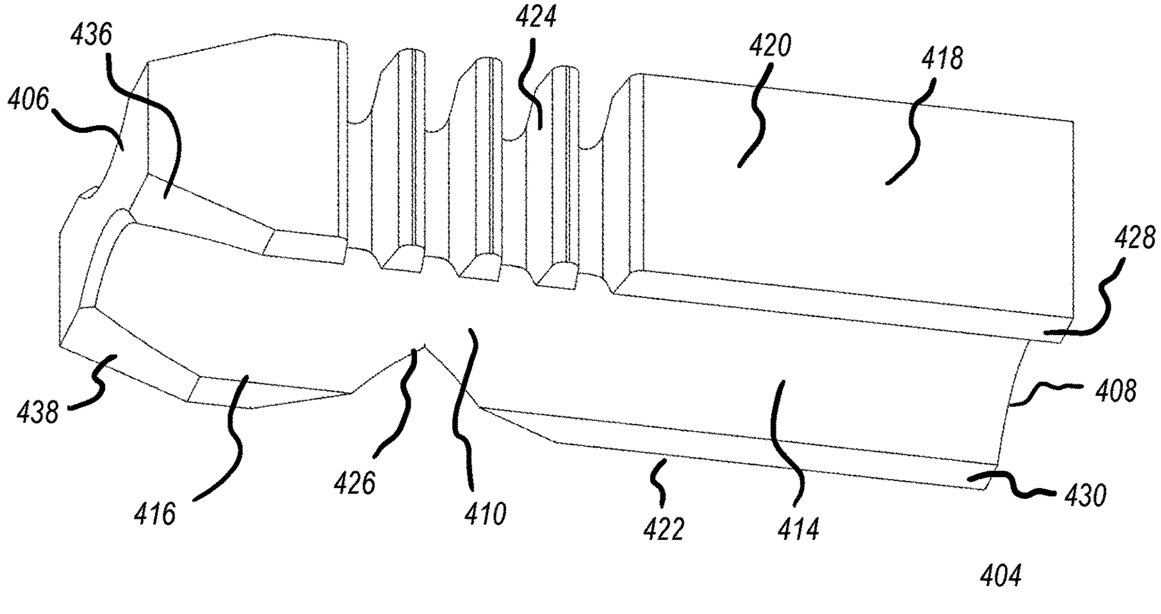
Figure 5C:
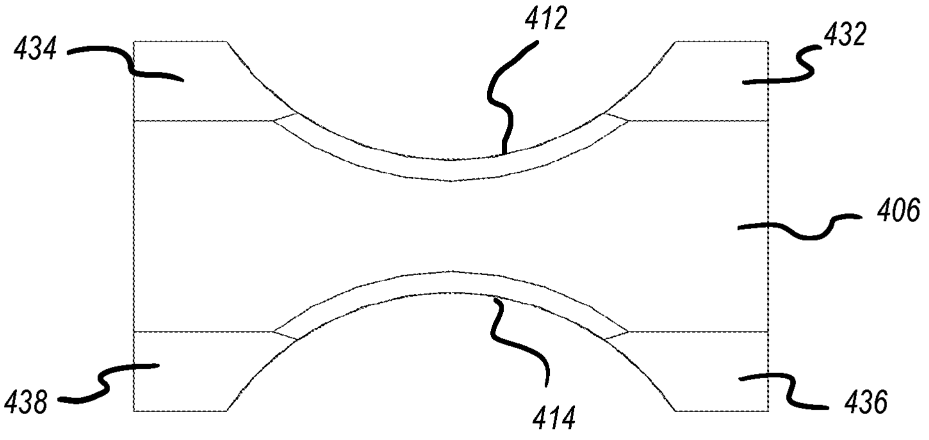
FIGS. 5C-5F illustrate front, back, and side views of the leg bolster component of FIGS. 5A and 5B.
Figure 5D:
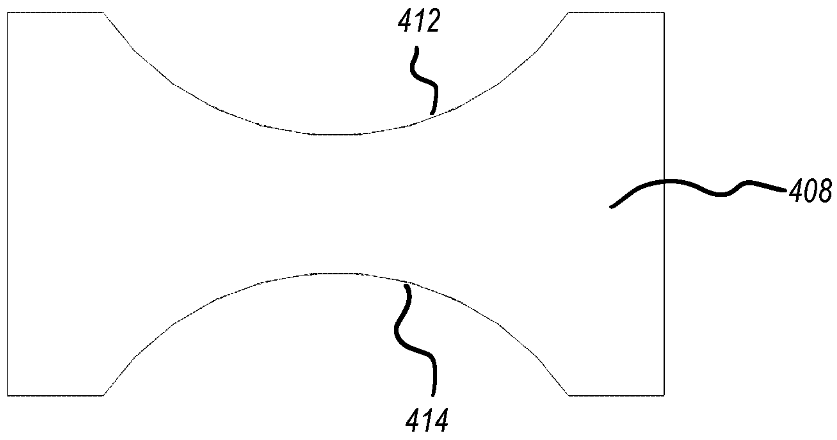
Figure 5E:
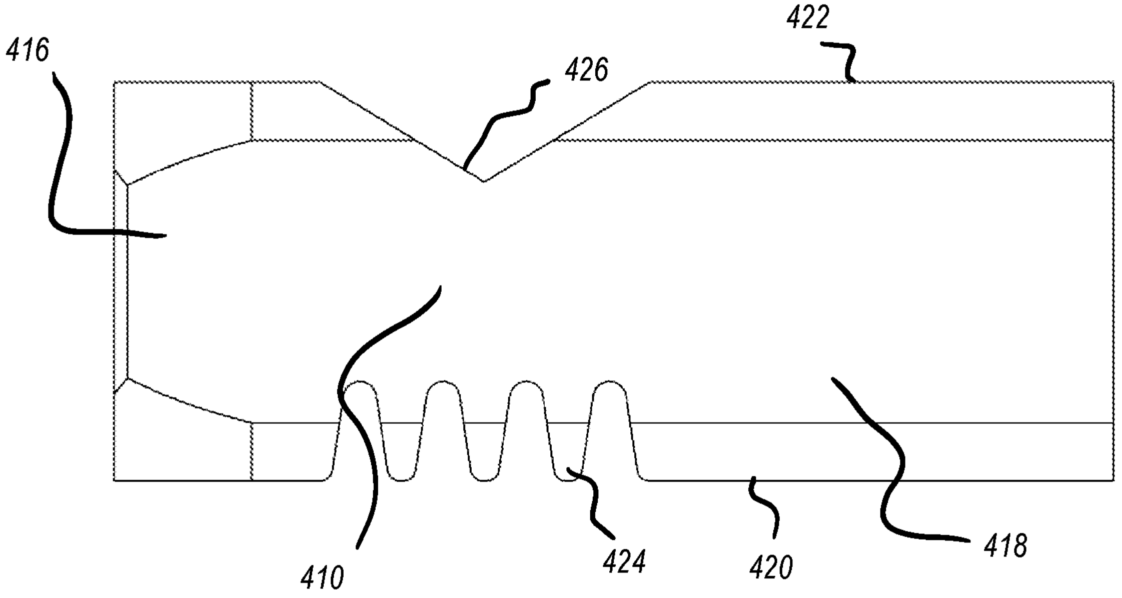
Figure 5F:
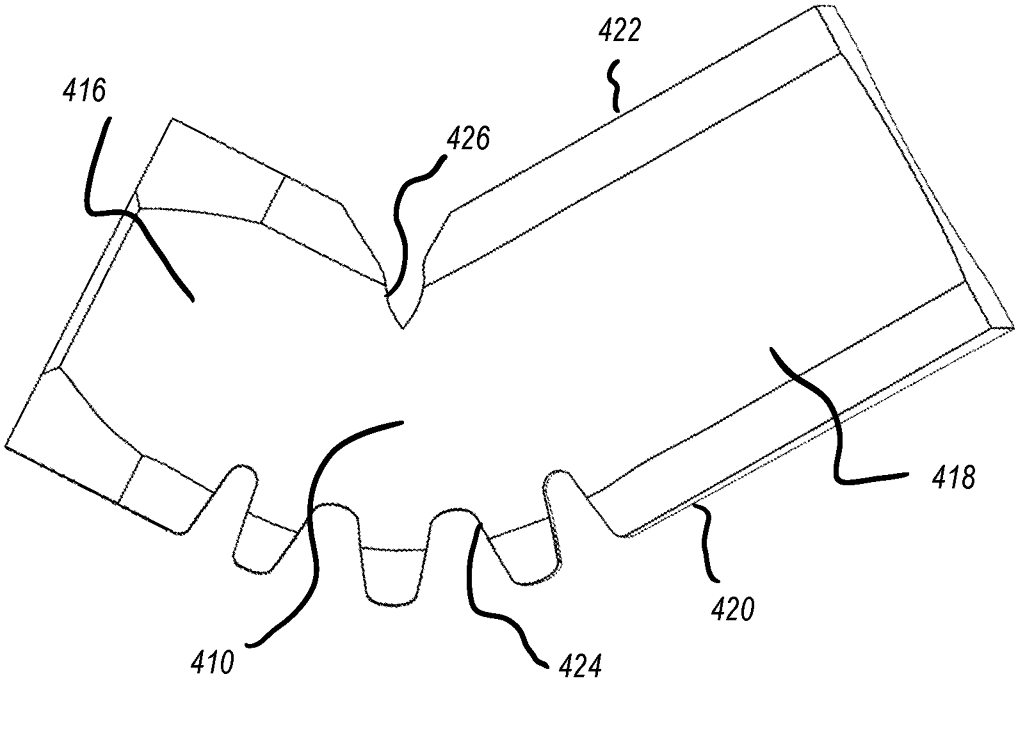

FIGS. 5A-5F illustrate various views of an exemplary leg bolster 400: FIG. 5A illustrates an isometric view of an upper side 402 of the device: FIG. 5B illustrates an isometric view of a lower side 404 of the device: FIG. 5C illustrates a view of a superior end 406 of the device: FIG. 5D illustrates a view of an inferior end 408 of the device: FIG. 5E illustrates a plan view of the device in an unflexed position; and FIG. 5F illustrates a plan view of the device in the flexed position.

The leg bolster 400 includes an upper leg channel 412 extending from the superior end 406 to the inferior end 408 along the upper side 402, and a lower leg channel 414 extending from the superior end 406 to the inferior end 408 along the lower side 404 of the device. A knee flexion structure 410 is disposed between the superior end 406 and inferior end 408. The knee flexion structure 410 is configured to enable a superior portion 416 (the portion between the knee flexion structure 410 and the superior end 406) to flex and bend relative to an inferior portion 418 (the portion between the knee flexion structure 410 and the inferior end 408) in an anterior/posterior direction.

The knee flexion structure 410 includes an expandable element 424 disposed on an anterior side 420 of the device, and a compressible element 426 disposed on a posterior side of the device 422. The expandable element 424 and compressible element 426 function to allow the anterior side of the knee flexion structure 410 to stretch and expand and to allow the posterior side of the knee flexion structure 410 to collapse to allow the knee flexion structure 410 to function as a "joint" and thereby allow the inferior portion 418 and superior portion 416 to move relative to one another.

As shown, the expandable element 424 may be formed as an arrangement of ribs and notches along the anterior side of the knee flexion structure 410. The collapsible element 426 may be formed as a cutout that starts at the posterior side and extends inwardly/anteriorly. The cutout may have a wedge shape that is wider posteriorly and narrows anteriorly.

As best shown in FIGS. 5A and 5B, the upper leg channel 412 is defined by an anterior sidewall 428 and a posterior sidewall 430. A superior segment 432 of the anterior sidewall and a superior segment 434 of the posterior sidewall may slope downward from the upper side 402 to the superior end 406 to form a groin portion 440 of the device. Corresponding superior segments 436 and 438 of the anterior and posterior sidewalls may slope upward from the lower side 404 to the superior end 406 to further define the groin portion. The groin portion provides a contoured, gradient width that better fits patient anatomy and allows better, more comfortable positioning of the patient's thigs into the device. The superior segments 432, 434, 436, 438 may be sloped at an angle of about 10 to about 40 degrees, or more preferably about 15 to about 30 degrees.

The leg bolster 400 is preferably formed from a foam material having an ILD of about 10 to about 50 pounds (about 4.54-22.7 kg), or more preferably about 15 to about 35 pounds (about 6.8-15.88 kg). A firmness within such ranges provides sufficient firmness to support the patient's legs and prevent contact between bony protuberances of the knees while also being flexible enough to allow for bending and flexing of the knee flexion structure 410 and being comfortable to the soft tissues in contact with the leg bolster 400.

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, or less than 1% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an," and "the" do not exclude plural referents unless the context clearly dictates otherwise. Thus, for example, an embodiment referencing a singular referent (e.g., "widget") may also include two or more such referents.

It will also be appreciated that embodiments described herein may include properties, features (e.g., ingredients, components, members, elements, parts, and/or portions) described in other embodiments described herein. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. A patient positioning system configured to position the patient in a lateral decubitus position in preparation for a lateral approach spine procedure, the system comprising:

a base section having a head bolster, an axillary bolster, and a hip bolster;

a lateral arm support configured to support the arms of the patient in a generally parallel position extending in the anterior direction away from the torso of the patient, wherein the lateral arm support comprises a pair of spaced apart panels including a superior panel and an inferior panel, each panel including an upper side, a lower side, a posterior side, and an anterior side defining an upper side, a lower side, a posterior side, and an anterior side of the lateral arm support;

an upper arm support surface extending between the upper side of the superior panel and the upper side of the inferior panel, wherein the upper arm support surface slopes downward from the posterior side to the anterior side;

a lower arm support surface extending between the lower side of the superior panel and the lower side of the inferior panel;

and, at least one of a torso strap that attaches to the base section and is configured to extend up and over the patient's torso to aid in securing the upper body of the patient in a desired lateral position and the arms extended in the direction away from the torso or a hip strap configured to extend up and over the patient's hip with one or more hip traction straps attached to the hip strap and that are configured to pull inferiorly on the hip strap and apply inferior traction to the upper side of the patient's hip.

2. The system of claim 1, wherein the axillary bolster, the hip bolster, or both include one or more selectively inflatable bladders for adjusting degree of patient support thereby.

3. The system of claim 1, wherein the head bolster includes an upper layer formed of a first foam material and an interior layer formed of a second foam material, wherein the second foam material is firmer than the first foam material.

4. The system of claim 1, wherein the head bolster includes a superior end and an inferior end, and wherein an upper surface of the head bolster angles downward from the inferior end to the superior end.

5. The system of claim 1, wherein the head bolster includes an ear cutout.

6. The system of claim 1, wherein the axillary bolster, the hip bolster, or both include an upper layer formed of a first foam material and an interior layer formed of a second foam material, wherein the second foam material is firmer than the first foam material.

7. The system of claim 1, wherein the axillary bolster, the hip bolster, or both include a median surface, a post that is raised above the median surface and is disposed on a posterior side of the median surface, and a wedge that angles downward from the median surface and is disposed on an anterior side of the median surface.

8. The system of claim 1, wherein the axillary bolster and the hip bolster each have an inferior side, a superior side, and a width extending from the inferior side to the superior side, wherein the hip bolster has a greater width than the axillary bolster.

9. The system of claim 1, wherein the panels have shapes that define an anterior cutout extending from the anterior side of the lateral arm support towards the posterior side of the lateral arm support, the cutout allowing increased access to the lower arm of a patient.

10. The system of claim 1, wherein the lower arm support surface of the lateral arm support slopes upward from the posterior side to the anterior side.

11. The system of claim 1, wherein a posterior portion of the upper arm support forms a chest bumper to prevent forward anterior rolling of the patient.

12. The system of claim 1, wherein the panels and upper arm support surface are selectively detachable from the lower arm support surface.

13. The system of claim 1, further comprising a leg bolster, wherein the leg bolster comprises:

a superior portion with a superior end, an inferior portion with an inferior end, an upper side, and a lower side;

an upper leg channel extending from the superior end to the inferior end along the upper side;

a lower leg channel extending from the superior end to the inferior end along the lower side; and a knee flexion structure disposed between the superior end and the inferior end, the knee flexion structure configured to allow the superior portion and the inferior portion to bend relative to one another in an anterior/posterior direction.

14. The system of claim 13, wherein the knee flexion structure comprises an expandable element disposed along an anterior side, the expandable element being configured to stretch and expand to allow the inferior portion to move posteriorly relative to the superior portion, the expandable element optionally comprising an arrangement of ribs and notches.

15. The system of claim 13, wherein the knee flexion structure comprises a collapsible element disposed along a posterior side, the collapsible element allowing the posterior side to collapse to allow the inferior portion to move posteriorly relative to the superior portion, the collapsible element optionally comprising a cutout.

16. The system of claim 13, wherein the upper leg channel is defined by an anterior sidewall and a posterior sidewall, and wherein a superior segment of the anterior sidewall and a corresponding superior segment of the posterior sidewall slope downward from the upper side to the superior end to form a groin portion.

17. The system of claim 16, wherein the lower leg channel is defined by an anterior sidewall and a posterior sidewall, and wherein a superior segment of the anterior sidewall and a corresponding superior segment of the posterior sidewall slope upward from the lower side to the superior end to further define the groin portion.

18. A patient positioning system configured to position the patient in a lateral decubitus position in preparation for a lateral approach spine procedure, the system comprising:

a base section comprising a head bolster, an axillary bolster, and a hip bolster; and a lateral arm support configured to support the arms of the patient in a generally parallel position extending in the anterior direction away from the torso of the patient, wherein the lateral arm support includes a pair of spaced apart panels including a superior panel and an inferior panel, each panel including an upper side, a lower side, a posterior side, and an anterior side defining an upper side, a lower side, a posterior side, and an anterior side of the lateral arm support;

an upper arm support surface extending between the upper side of the superior panel and the upper side of the inferior panel; and a lower arm support surface extending between the lower side of the superior panel and the lower side of the inferior panel, wherein the upper arm support extends farther posteriorly than the lower arm support such that a posterior portion of the upper arm support forms a chest bumper to prevent forward anterior rolling of the patient, wherein the panels have shapes that define an anterior cutout extending from the anterior side of the lateral arm support towards the posterior side of the lateral arm support, the cutout allowing increased access to the lower arm of a patient.

19. A patient positioning system configured to position the patient in a lateral decubitus position in preparation for a lateral approach spine procedure, the system comprising:

a base section comprising a head bolster, an axillary bolster, and a hip bolster;

a lateral arm support configured to support the arms of the patient in a generally parallel position extending in the anterior direction away from the torso of the patient, wherein the lateral arm support includes a pair of spaced apart panels including a superior panel and an inferior panel, each panel including an upper side, a lower side, a posterior side, and an anterior side defining an upper side, a lower side, a posterior side, and an anterior side of the lateral arm support;

an upper arm support surface extending between the upper side of the superior panel and the upper side of the inferior panel; and a lower arm support surface extending between the lower side of the superior panel and the lower side of the inferior panel, wherein the upper arm support extends farther posteriorly than the lower arm support such that a posterior portion of the upper arm support forms a chest bumper to prevent forward anterior rolling of the patient, wherein the panels have shapes that define an anterior cutout extending from the anterior side of the lateral arm support towards the posterior side of the lateral arm support, the cutout allowing increased access to the lower arm of a patient; and a leg bolster positionable between the legs of the patient and configured to space the legs of the patient from one another.

20. The system of claim 1, wherein the head bolster, axillary bolster, and hip bolster comprise respective median surfaces for contacting and supporting a patient placed thereon, wherein at least the axillary bolster and hip bolster are separable from a support piece of the base section, and wherein the axillary bolster and/or hip bolster include a wedge disposed on an anterior side that angles downward from the median surface along an anterior direction.

* * * * *